(12) United States Patent
Ward

(10) Patent No.: US 6,450,224 B1
(45) Date of Patent: Sep. 17, 2002

(54) VEHICLE TRACTION DEVICE

(76) Inventor: Finis A. Ward, 930 Hawthorne Ave., St. Charles, MO (US) 63301-4724

( * ) Notice: Subject to any disclaimer, the term of this patent is extended or adjusted under 35 U.S.C. 154(b) by 0 days.

(21) Appl. No.: 09/723,267

(22) Filed: Nov. 28, 2000

(51) Int. Cl.$^7$ .............................................. B60C 11/00
(52) U.S. Cl. .................................. 152/218; 152/225 R
(58) Field of Search ............................ 152/213 R, 217, 152/218, 225 R, 226, 227, 228

(56) References Cited

U.S. PATENT DOCUMENTS

| | | | | |
|---|---|---|---|---|
| 2,767,761 A | * | 10/1956 | O'Higgins | 152/218 |
| 2,873,783 A | * | 2/1959 | O'Higgins | 152/218 |
| 3,115,920 A | * | 12/1963 | Sand, Sr. | 152/218 |
| 3,117,612 A | * | 1/1964 | Minutilla | 152/218 |
| 4,089,359 A | * | 5/1978 | Jones | 152/218 |
| 4,747,438 A | * | 5/1988 | Joung | 152/218 |
| 4,862,936 A | * | 9/1989 | McDonough | 152/218 |
| 5,033,522 A | * | 7/1991 | Metraux | 152/218 |
| 5,076,335 A | * | 12/1991 | Koshi | 152/226 |

* cited by examiner

Primary Examiner—S. Joseph Morano
Assistant Examiner—Long Bao Nguyen

(74) Attorney, Agent, or Firm—Henry W. Cummings

(57) ABSTRACT

In accordance with the present invention, the traction device 10 includes mounting plate assembly 30, and cleats 40. Mounting assembly 30 comprises plate 31 and center ring 35. Plate 31 and center ring 35 are made of steel aluminum alloy or other heavy-duty material capable of withstanding the stresses to be encountered during the application of the invention. Tabs 32 are part of plate 30. As an example they may be formed by bending and folding material up 90 degrees from the plate surface during the manufacturing process. Center ring 35 fits down over and is welded to tabs 32 such that after assembly, holes 37 in center ring 35 will match holes 38 in tabs 32.

Each cleat 40 is a single piece of steel or another heavy-duty material capable of withstanding the stresses expected to be encountered during the application of the invention. Cleats 40 are manufactured such that a portion of each cleat 40 is bent and folded to form a gripping element 41. Each cleat 40 is assembled to mounting plate 30 with bolt 42, compression spring 48, washer 47, and nut 49. Handles 45 are attached to cleats 40 by welded studs 53. Bolts 42, compression springs 48, washers 47, and nuts 49 are off-the-shelf items available at any hardware store or building supply house. Handles 55 can be made of metal, plastic, or any other suitable material. They are commonly available items found in hardware stores or building supply houses, or manufactured especially for this application.

21 Claims, 3 Drawing Sheets

VEHICLE TRACTION DEVICE

I FIELD OF THE INVENTION

This invention relates to devices which enable a vehicle to retain traction on muddy, icy, or snow-covered surfaces, providing an extra measure of safety. This invention enables any motorist, regardless of body strength, to install it without tools. It is lightweight, easily storable, and can be installed without moving the vehicle. Additionally, it may be easily transfered from one vehicle to another.

II BACKGROUND OF THE INVENTION

U.S. Pat. No. 1,273,271 discloses a snap connection for tire chains. This invention is designed specifically for vehicles having spoked wheels.

U.S. Pat. No. 2,273,753 discloses an antiskid device comprising a plurality of cross members and chain segments. These parts must be installed then adjusted by means of tumbuckles.

U.S. Pat. No. 2,460,023 discloses an antiskid tire chain anchoring device. This invention depends upon a fixed attatchment to the vehicle's axle or wheel to secure any commercially available tire chains.

U.S. Pat. No. 2,494,850 discloses a nonskid device. This invention consists of up to six individually mounted segments, which can be used individually or in concert with other segments. Certain portions of this invention must be mounted on a vehicle's wheel by means of semi-permanent fasteners (screws), or permanent fasteners (rivets).

U.S. Pat. No. 2,733,748 discloses a cross chain attaching device. This invention is designed to be mounted permanently or semi-permanently to a vehicle's axle and brake drum. This invention comprises a plurality of cross chains and other mounting hardware.

U.S. Pat. No. 2,754,874 discloses an antiskid device. This invention is designed to be semi-permanently attached to a vehicle's wheels and may remain attached throughout the season. This invention can be remotely extended for use or retracted when not needed. When needed, it is actuated from the driver's seat (or other remote location) by means of flexible hydraulic connections routed to each wheel on which the device is mounted.

U.S. Pat. No. 2,986,190 discloses a traction device for automotive vehicles. This invention is comprised of a rigid disc that is mounted to the lug nuts of the vehicle. Gripping arms project radially from the hub of the disc. The distance they project can be manually adjusted to provide more or less gripping action on an icy surface. The gripping arms are detachable if not needed.

U.S. Pat. No. 3,051,211 discloses a traction device designed for heavy trucks.

U.S. Pat. No. 3,095,919 discloses a traction device. This invention utilizes mounting rings that are semi-permanently mounted to the outer diameter of a vehicle's wheel rims. Removable traction devices are mounted to these rings when needed.

U.S. Pat. No. 3,426,824 discloses a tire adapter assembly. This invention uses disc shaped plates mounted on both sides of a vehicle's wheels. Tire chains are draped transversely across the tire and connected to both plates.

U.S. Pat. No. 5,896,906 discloses a vehicle tire antiskid device. This invention depends upon two retaining rings pre-installed on the outer and inner surfaces of the wheel hub. A plurality of chain segments are disposed transversely across the tire and connected to the retaining rings.

III SUMMARY OF THE INVENTION

A. Objects of the Invention

One object of the present invention is to provide a means to increase available traction for a vehicle which needs to traverse a muddy, icy, or snow-covered surface.

Another object of the present invention is to provide a traction device which is light in weight.

Another object of the present invention is to provide a traction device which is simple to install.

Another object of the present invention is to provide a traction device which may be installed without having to move or jack up the vehicle in question.

Another object of the present invention is to provides a traction device which is sufficiently light to be easy to transport, affording easy storage and portability from one vehicle to another and use for any motorist, regardless of physical strength.

Another object of the present invention to provides a traction device which is simple in construction without requiring a permanent or semi-permanent installation.

B. Summary

In accordance with the present invention, the traction device 10 includes mounting plate assembly 30, and cleats 40. Mounting assembly 30 comprises plate 31 and center ring 35. Plate 31 and center ring 35 are made of steel, aluminum alloy or other heavy-duty material capable of withstanding the stresses to be encountered during the application of the invention Tabs 32 are part of plate 30. As an example they may be formed by bending and folding material up 90 degrees from the plate surface during the manufacturing process. Center ring 35 fits down over and is welded to tabs 32 such that after assembly, holes 37 in center ring 35 will match holes 38 in tabs 32.

Each cleat 40 is a single piece of steel or another heavy-duty material capable of withstanding the stresses expected to be encountered during the application of the invention. Cleats 40 are manufactured such that a portion of each cleat 40 is bent and folded to form a gripping element 41. Each cleat 40 is assembled to mounting plate 30 with bolt 42, compression spring 48, washer 47, and nut 49. Handles 45 are attached to cleats 40 by welded studs 53. Bolts 42, compression springs 48, washers 47, and nuts 49 are off-the-shelf items available at any hardware store or building supply house. Handles 45 can be made of metal, plastic, or any other suitable material. They are commonly available items found in hardware stores or building supply houses, or manufactured especially for this application.

IV THE DRAWINGS

V DESCRIPTION OF PREFERRED EMBODIMENTS

Figure 1:
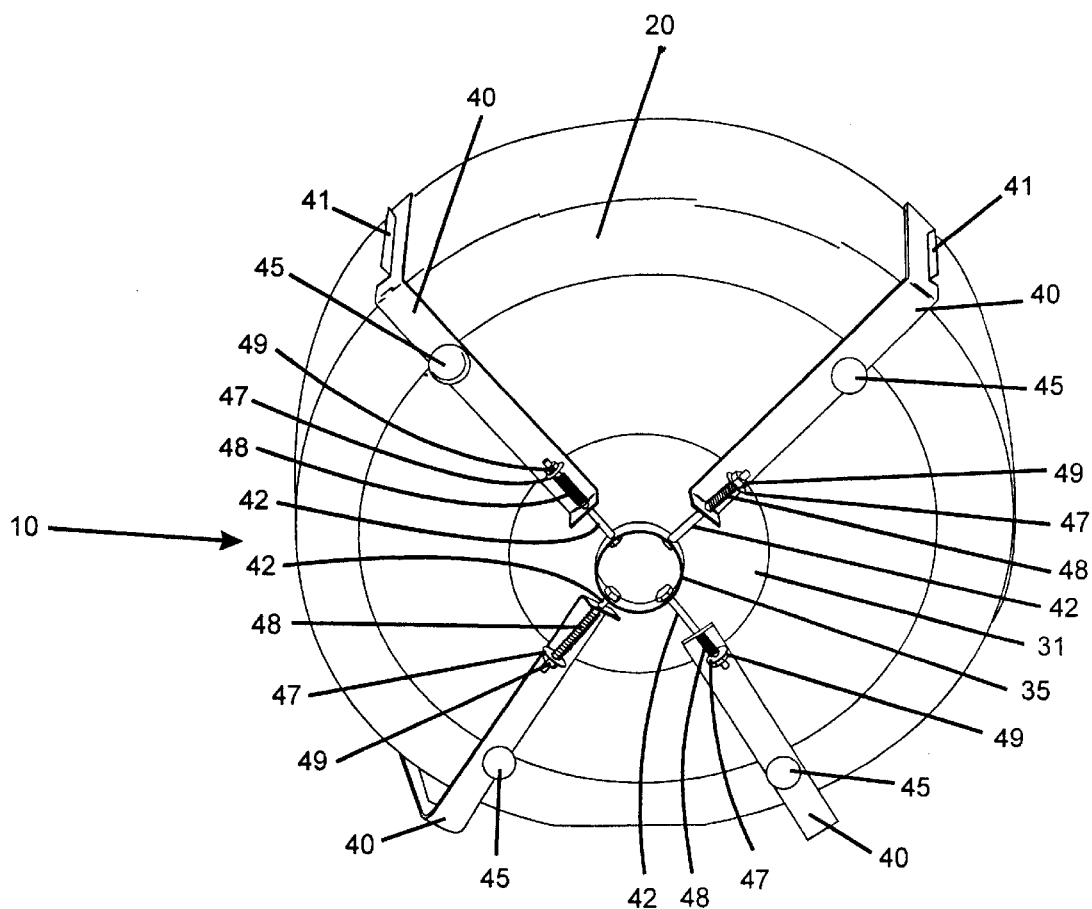
FIG. 1 is a perspective view of the present invention as it is mounted on the tire of a vehicle.

In accordance with the present invention, the traction device 10 includes mounting plate assembly 30, and cleats 40.

Mounting assembly 30 comprises plate 31 and center ring 35. Plate 31 and center ring 35 are made of steel, aluminum alloy or other heavy-duty material capable of withstanding the stresses to be encountered during the application of the invention. Tabs 32 are part of plate 30. As an example they may be formed by bending and folding material up 90 degrees from the plate surface during the manufacturing process. Center ring 35 fits down over and is welded to tabs 32 such that after assembly, holes 37 in center ring 35 will match holes 38 in tabs 32.

Each cleat 40 is a single piece of steel or another heavy-duty material capable of withstanding the stresses expected to be encountered during the application of the invention. Cleats 40 are manufactured such that a portion of each cleat 40 is bent and folded to form a gripping element 41. Each cleat 40 is assembled to mounting plate 30 with bolt 42, compression spring 48, washer 47, and nut 49.

Handles 45 are attached to cleats 40 by welded studs 53. Bolts 42, compression springs 48, washers 47, and nuts 49 are off-the-shelf items available at any hardware store or building supply house. Handles 45 can be made of metal, plastic, or any other suitable material. They are commonly available items found in hardware stores or building supply houses, or manufactured especially for this application.

In use, each traction device is mounted to the vehicle's tire as shown in FIG. 1. The user places traction device 10 in the approximate center of the vehicle wheel 20. Gripping a handle 45, the user pulls each cleat 40 over the tire tread. After all cleats are positioned, it may be necessary to adjust the tension of the compression springs 48. This is done by using common wrenches to hold bolt 42 and turn nut 49, until proper tension is achieved on each cleat.

Figure 2:
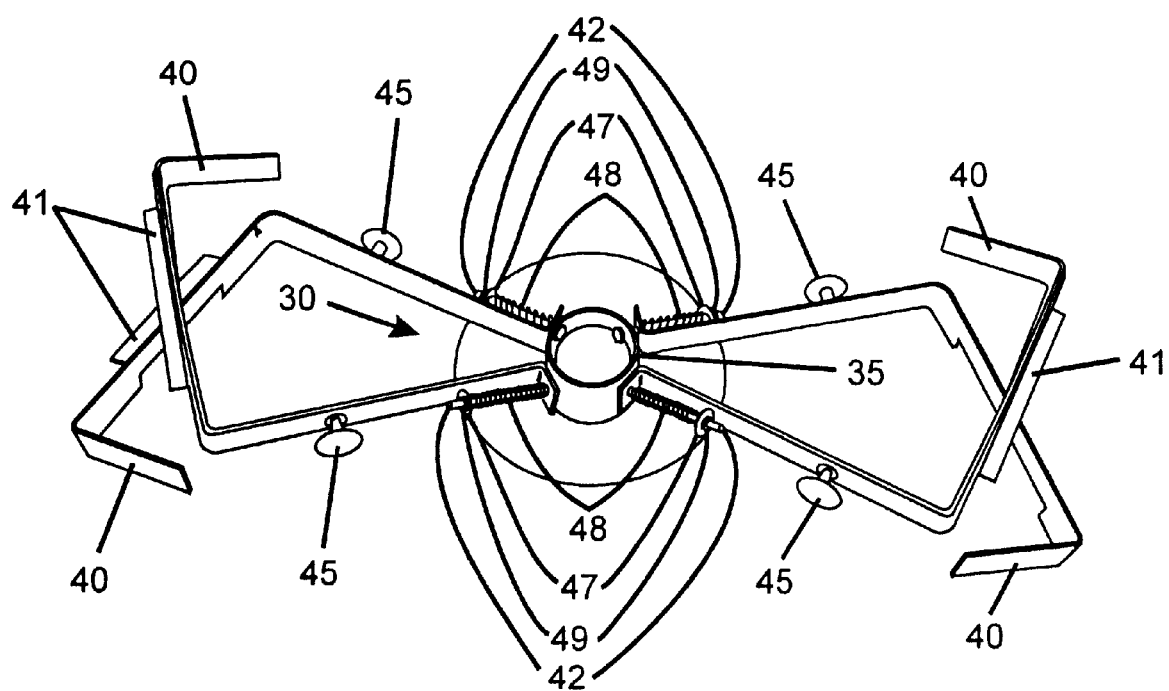
FIG. 2 is a perspective view of the present invention as it is folded for storage.
Figure 3:
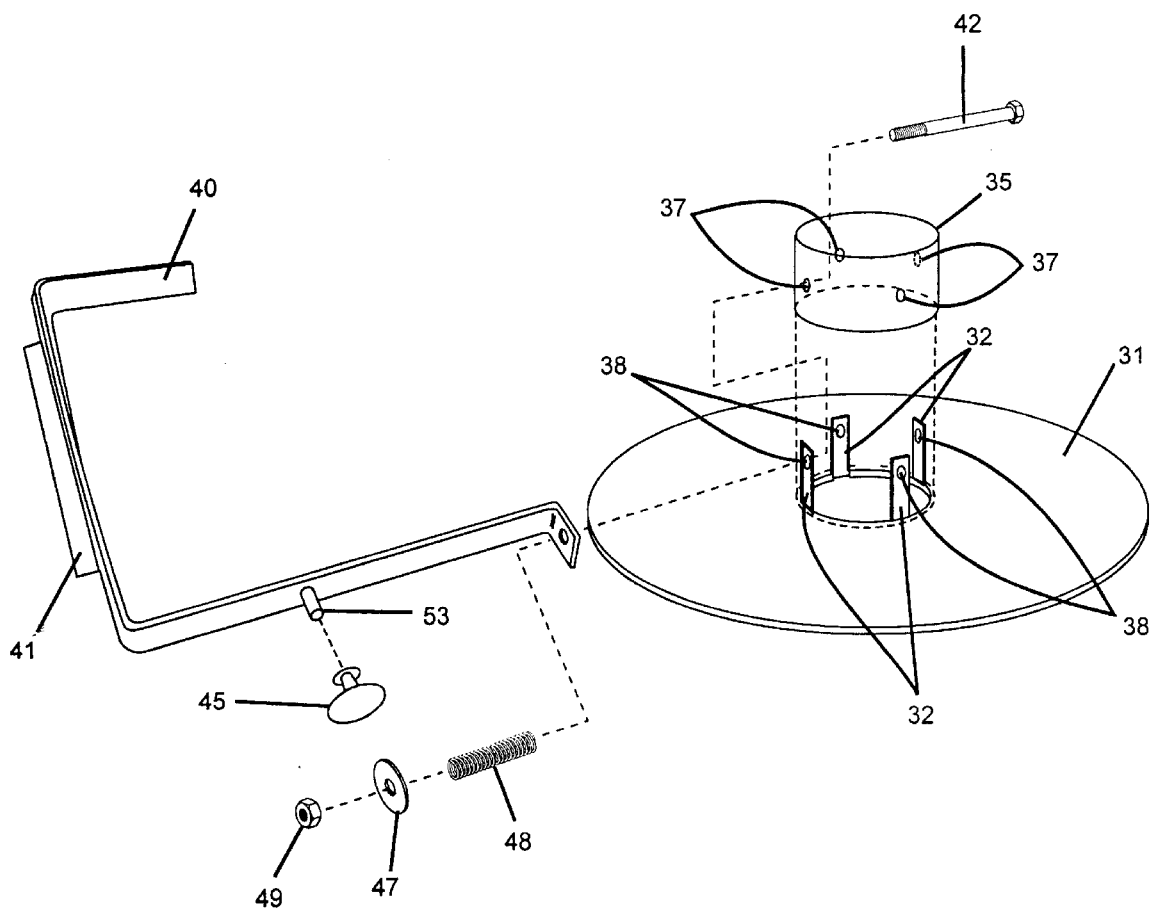
FIG. 3 is an exploded view of the present invention showing the mounting plate assembly and one representative cleat, with its associated attaching hardware.

For storage, cleats 40 can pivot on bolts 42, allowing the invention to lay reasonably flat, as shown in FIG. 2.

What is claimed is:

1. A traction device made of heavy-duty material capable of withstanding the stresses expected to be encountered during use of said traction device comprising:
    a mounting plate comprising a center ring integrally connected to a plate having formed tabs and
    a plurality of cleats for attaching said mounting plate to the wheel of a vehicle
    said cleats comprising a first section formed and bent to provide a surface for maintaining the cleat in close contact to said center ring;
    a second section bent at about 90 degrees to said first section which is held in close contact to the outside of the vehicle's tire; and
    a third section bent at 90 degrees to said second section, which provides a surface for maintaining the cleat in close contact to the tread surface of the vehicle's tire.

2. A traction device according to claim 1 wherein said cleats comprise a fourth section bent at about 90 degrees to said third section, which provides a surface for maintaining the cleat in close contact to the inside of the vehicle's tire.

3. A traction device according to claim 1 including means effective to secure said cleats to the mounting plate assembly.

4. A traction device according to claim 1 wherein said traction device is made of a material selected from steel and aluminium alloy.

5. A traction device according to claim 3 wherein said mounting plate comprises a center ring integrally connected to a plate having formed tabs.

6. A traction device according to claim 5 wherein said center ring includes holes drilled for mounting purposes.

7. A traction device according to claim 6 wherein said device includes a plurality of cleats and at least one handle.

8. A traction device made of heavy-duty material capable of withstanding the stresses expected to be encountered during use of said traction device comprising:
    a mounting plate comprising a center ring integrally connected to a plate having formed tabs,
    a plurality of cleats for attaching said mounting plate to the wheel of a vehicle; and said formed tabs are bent and folded about 90 degrees from the surface of the mounting plate.

9. A traction device according to claim 8 wherein said center ring includes holes drilled for mounting purposes.

10. A traction device according to claim 9 wherein said holes in the center ring match holes formed into the formed tabs.

11. A traction device according to claim 10 wherein said handles are attached to said cleats by welded studs.

12. A traction device according to claim 11 wherein said handles provide a convenience means of mounting, removing, and storing said traction device.

13. A traction device according to claim 1 having means to secure said cleats to said center ring.

14. A traction device according to claim 13 wherein said means are commonly available hardware store items.

15. A traction cleat comprising:
    a first section formed and bent to provide a surface for maintaining the cleat in close contact to said center ring;
    a second section bent at 90 degrees to said first section, which is held in close contact to the outside of the vehicle's tire;
    a third section bent at 90 degrees to said second section, which provides a surface for maintaining the cleat in close contact to the tread surface of the vehicle's tire; and
    a fourth section bent at 90 degrees to said third section, which provides a surface for maintaining the cleat in close contact to the inside of the vehicle's tire.

16. A traction cleat according to claim 15 including means effective to secure said cleat to the mounting plate assembly.

17. A traction cleat according to claim 16 wherein formed tabs are bent and folded 90 degrees from the surface of the mounting plate.

18. A traction device cleat according to claim 17 wherein holes in the center ring match holes formed into the formed tabs.

19. A traction cleat according to claim 18 wherein handles are integrally attached to said cleats.

20. A traction cleat according to claim 19 wherein said handles are integrally attached to said cleats by welded studs.

21. A traction cleat according to claim 20 wherein said handles are integrally attached to said cleats by welded studs.

* * * * *